No. 706,293. Patented Aug. 5, 1902.
F. L. BEAMOND.
PNEUMATIC TREAD OR TIRE.
(Application filed Oct. 11, 1901. Renewed July 9, 1902.)
(No Model.) 2 Sheets—Sheet 1.
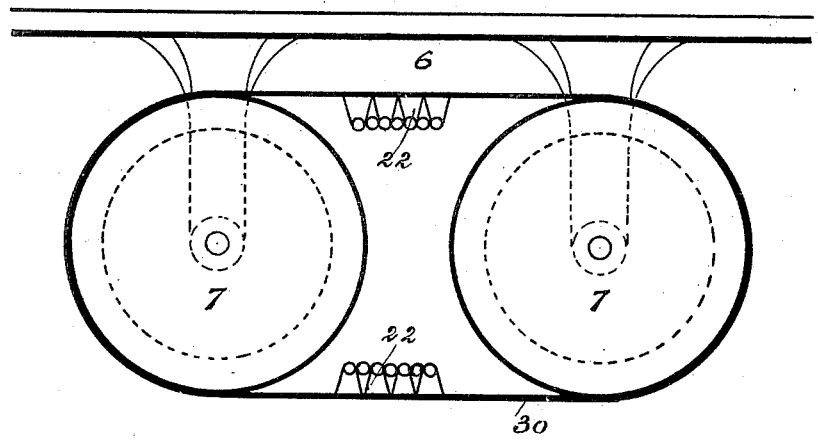
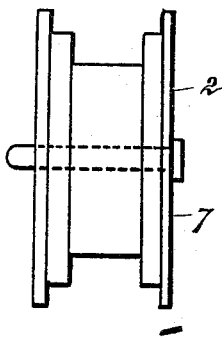

No. 706,293. Patented Aug. 5, 1902.
F. L. BEAMOND.
PNEUMATIC TREAD OR TIRE.
(Application filed Oct. 11, 1901. Renewed July 9, 1902.)
(No Model.) 2 Sheets—Sheet 2.
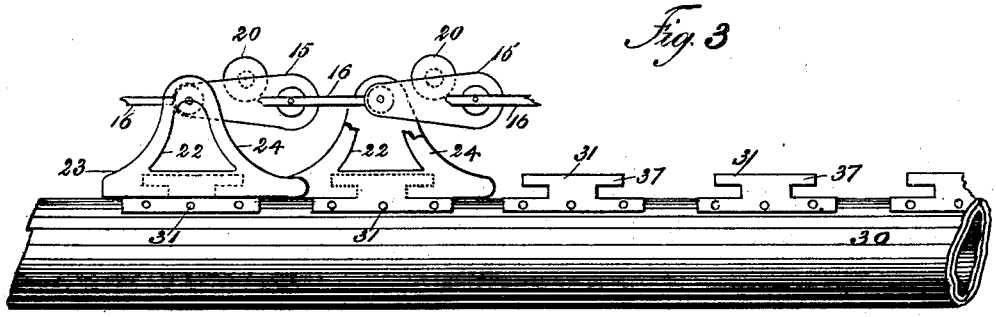
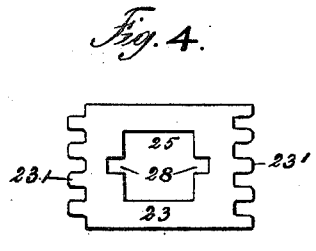
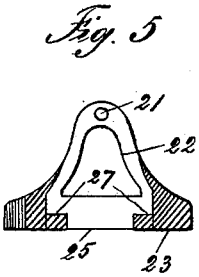
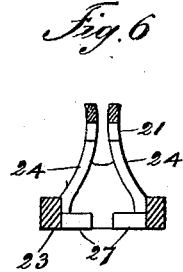
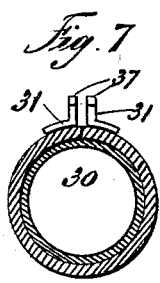
WITNESSES
INVENTOR
Frank L. Beamond
BY
ATTORNEYS

UNITED STATES PATENT OFFICE.

FRANK LOESCHER BEAMOND, OF SUTTON-COLDFIELD, ENGLAND.

PNEUMATIC TREAD OR TIRE.

SPECIFICATION forming part of Letters Patent No. 706,293, dated August 5, 1902.

Application filed October 11, 1901. Renewed July 9, 1902. Serial No. 114,961. (No model.)

*To all whom it may concern:*

Be it known that I, FRANK LOESCHER BEAMOND, a subject of the King of Great Britain, residing at Sutton-Coldfield, near Birmingham, in the county of Warwick, Kingdom of England, have invented certain new and useful Improvements in Pneumatic Treads or Tires, of which the following is a full and complete specification, such as will enable those skilled in the art to which it appertains to make and use the same.

This invention relates to vehicles of the endless-tread type, which endless treads are rotated by a plurality of traction-wheels; and the object is to provide a new and improved form of tubular pneumatic tire therefor.

To such ends my invention consists in substance of a vehicle provided with a plurality of grooved traction-wheels on either side, carrying in such grooves a plurality of metallic members, linked together by suitable links and removably secured at the bottom to the tubular endless tread, which is of the pneumatic form.

In the accompanying drawings, forming part of this specification, in which like numerals of reference designate corresponding parts in the several views, Figure 1 is a side view of two of the wheels upon one side of a four-wheeled vehicle provided with my improved form of endless tubular pneumatic tread. Fig. 2 is an edge view of one of such traction-wheels. Fig. 3 is a side view, on an enlarged scale, of a portion of such endless tubular tread, showing the metallic link chain carrying the same and the method of securing the two together. Fig. 4 is a bottom view in perspective of one of the metallic link-securing members. Fig. 5 is a side, and Fig. 6 an end, view thereof, both being taken in central vertical section; and Fig. 7 is a view of a portion of the endless tire or tread in cross-section, showing the position in which the metal securing-lugs to secure the link members thereto are placed upon such tire or tread.

In the drawings, 6 designates the frame of a vehicle having traction-wheels 7, which are of the grooved form shown in detail in Fig. 2. Passing around the end of each pair of the wheels at the front and rear upon either side of the vehicle is in each case an endless chain, formed of suitable link-pieces 15 and 16, one or both of these links being usually provided with antifriction-rollers 20, which chain is of such length as to form a tight working belt upon the bottom of the peripheral groove of the two wheels when passed around the same, as shown in Fig. 1.

Thus far the construction is covered by former United States Letters Patent No. 666,893, granted to me January 29, 1901, and forms no part of this invention; but to each of the links at their pivotal points are secured in any desired manner, preferably by having the pivot-stud connecting such links passed through holes 21 on the top thereof, a plurality of metallic securing members 22 of my new and improved forms, each provided with a base-plate 23, provided with the interlocking dovetailed forward and rear edges, which plate is provided with the upwardly-extending side pieces 24, between which at the bottom is formed the bottom orifice 25, provided with the end flange 27 and having the central entrance-slot 28, as shown.

The endless tread of my improved form consists of a hollow pneumatic tube 30, which may be either of the single or double tube form; but in either event the same is provided on the inner side with a plurality of securing-lugs 31, which are secured in pairs to such tubular tread or tire in any desired manner, usually by being riveted thereto and vulcanized therein when the tube is of the single-tube form, and when such tube is of the double-tube form, the outer tube of which consists of a strip slitted longitudinally down the center of the interior side thereof, such lugs 31 are secured opposite to one another upon the edges of such strip, so that when the opposite lugs or securing-pieces are brought into contact by the folding of the tube-strip along such longitudinal line so as to form a tube it will form an outer tube or casing for the reception of the inner air-tube 34. In either case to secure such endless tread or tire in position upon the vehicle it is passed around the wheels 7 in the deflated condition, and one by one the upper T-shaped extension 37 of the lugs are passed up through the slot 28 of the bottom plates of the securing members of the chain and forced over the end shoulder 27 on the side of the slot 28 upon which such lug is located. The oppositely-located sister lug is also inserted through such slot in like manner and forced over the like shoulder 27 upon the opposite side, and after all the securing-lugs have been secured to such securing members in this manner it will be seen that upon the inflation of the tire by an air-pressure pump or other suitable air-pressure-supplying device such expansion of the tire, such securing-lugs being appropriately spaced as to distance apart, will lock the same in position in the securing member by forcing the lugs completely over the shoulders 27, so as to prevent separation thereof, and it will also be seen that the tread may be as quickly and easily removed by a deflating and reversal of this operation.

By the construction shown I provide a simple, cheap, and efficient method of detachably securing endless pneumatic treads to a metallic chain which carries such tubular tread or tire around the traction-wheel.

Having thus fully described my invention, what I claim as new, and desire to secure by Letters Patent, is—

1. In a device of the class described, the combination with a plurality of metallic securing members consisting of flat base or bottom plates having upwardly-extending securing portions secured together at the top forming a link chain, of a hollow tubular endless tread provided with means for removably securing such tread to the face or bottom plates of pieces, substantially as shown and described.

2. In a device of the class described, the combination with a plurality of securing members each consisting of a base or bottom plate provided with central orifices having end shoulders located at the side of the center of the end portions of said orifice, of a tubular tread or tire provided with metallic securing-lugs secured thereto in pairs the top members of which lugs are adapted to pass through the central portion of the hollow base or bottom plates and to be forced over upon the shoulders thereof upon the inflation of the tubular tread or tire so as to lock such tire to the base or bottom plates of the securing members so long as the same remains inflated, substantially as shown and described.

3. In a device of the class described, the combination with a plurality of securing members each consisting of a base or bottom plate provided with a rectangular central orifice provided at the end with a central entrance-slot, of link members securing such securing members together at the top in such manner that there will be a pivot-joint at the top of each of such securing members, a pivot-joint member secured between each pair of such members, an antifriction-roller carried by one of each pair of the link members so connecting the securing members, and a pair of T-shaped metallic securing-lugs for each pair of securing members secured to a tubular endless tread or tire, the construction being such that the securing-lugs may be passed through the central slotted portion of the abutting securing members one by one and upon inflation of the tire will be forced over the end shoulders thereof so as to lock such securing members to the tubular endless tread or tire so long as the same is inflated.

In testimony that I claim the foregoing as my invention I have signed my name, in presence of the subscribing witnesses, this 21st day of September, 1901.

FRANK LOESCHER BEAMOND.

Witnesses:
 E. S. FRIEND,
 ERNEST WYER.